E. ENSTRÖM AND E. A. HILDING.
COASTER BRAKE.
APPLICATION FILED OCT. 4, 1920.
1,412,393. Patented Apr. 11, 1922.
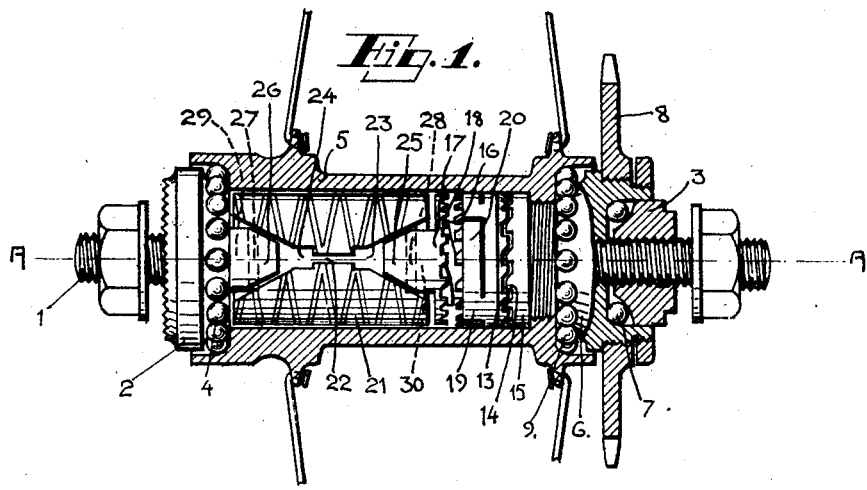
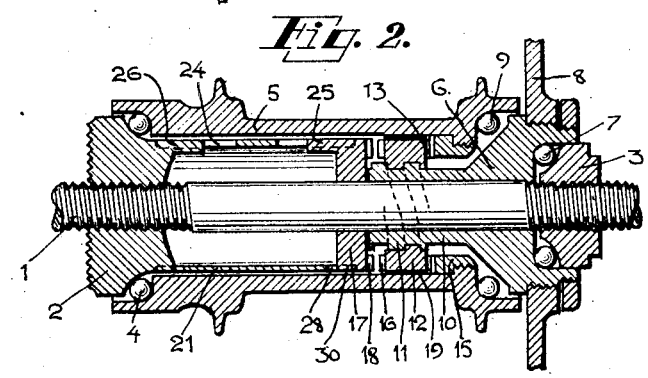
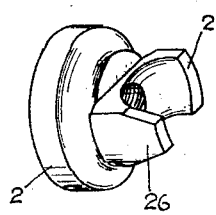 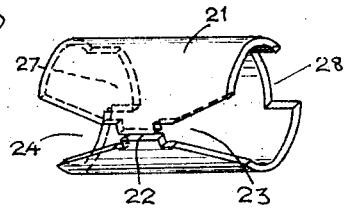 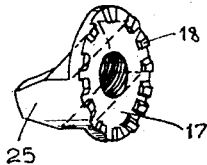
Inventors
E. Enström
E. A. Hilding
By H. R. Kerslake
Attorney

UNITED STATES PATENT OFFICE.

EDVARD ENSTRÖM AND ERNST ALFRED HILDING, OF MOTALA, SWEDEN, ASSIGNORS TO NORDISKA NAV AKTIEBOLAGET, OF MOTALA, SWEDEN.

COASTER BRAKE.

1,412,393.   Specification of Letters Patent.   Patented Apr. 11, 1922.

Application filed October 4, 1920. Serial No. 414,608.

*To all whom it may concern:*

Be it known that we, EDVARD ENSTRÖM and ERNST ALFRED HILDING, subjects of the King of Sweden, residing at Motala, Sweden, have invented certain new and useful Improvements in Coaster Brakes, of which the following is a specification.

This invention relates to an improved coaster-brake for bicycles and the like and more particularly to coaster-brakes of that type by which the braking is effected by forcing an expansible sleeve or shell, fixed in relation to the wheel hub, against the interior surface of said hub by means of wedges operating said expansible sleeve or shell.

The object of this invention is to provide a coaster brake of the type mentioned which combines simplicity in design with a great efficiency even when the operative surfaces of the wedges have been considerably worn.

In carrying the invention into effect there is provided a wedge movable towards the expansible sleeve so as to expand this in a known manner when the rider back pedals. Said wedge is thereby forced in direction towards a fixed member provided with another wedge operating the expansible sleeve on the end of same opposite the end upon which the movable wedge operates. The fixed member as well as the movable wedge are provided with lugs cooperating with notches in the sleeve at the respective ends thereof for the purpose to keep the sleeve stationary and prevent it from rotating.

In the accompanying drawing there is shown an embodiment of the invention wherein—

Figure 1 is an axial view of the improved coaster brake partly in section.

Figure 2 a sectional view of the coaster brake along the line A—A in Figure 1 and Figures 3–5 perspective views illustrating several of the parts of the brake in position to be assembled.

In the drawing 1 indicates the wheel spindle on each end of which there is threaded bearing cones 2 and 3, respectively. On the first mentioned bearing cone 2 the one end of the wheel hub 5 is mounted by means of a set of balls 4. On the other bearing cone 3 there is by means of a set of balls 7 rotatably mounted a head G upon which the sprocket gear 8 is threaded. Another set of balls 9 is inserted between the head G and the other end of the hub 5. A sleeve 10 projects inwardly from the head G and is provided with exterior threads 11 upon which there is threaded a nut 12. The nut 12 on each end surface is provided with axially projecting teeth 13 and 16 of which the teeth 13 under certain circumstances cooperate with similar teeth 14 on a ring 15 fixed by means of screw threads to the hub 5 and the teeth 16 at the opposite end of the nut 12 under certain circumstances cooperate with teeth 18 provided at the end of a sleeve shaped member 17 slidably mounted upon the spindle 1. Surrounding the nut 12 a ring 19 is fixed to said nut and is provided with flaps 20 bearing against the interior surface of the hub 5 and thus tending to transmit to the nut 12 the rotatory movement of the hub 5. 21 denotes an expansible sleeve cut through by a longitudinal slot 22 terminating in wedge-shaped notches 23 and 24 respectively. The first mentioned notch 23 cooperates with a wedge 25 projecting from the slidable member 17, and the notch 24 cooperates with a wedge 26 projecting from the bearing cone 2. The sleeve 21 also is at its ends provided with notches 27 and 28, respectively, located directly opposite the notches 24 and 23, respectively, and the bearing cone 2 and the slidable member 17 are formed with lugs 29 and 30, respectively, which engage in the notches 27 and 28, respectively, and serve to keep the expansible sleeve stationary preventing it from rotating.

The operation of the brake is as follows: As the rider pedals forwards, the nut 12 by means of the thread 11 will be thrown to the right (when looking upon the Figures 1 and 2) and its teeth 13 caused to engage the teeth 14 of the ring 15 fixed to the hub 5 which thus will be rotated in the forward direction. When the rider pedals backwards the nut 12 by means of the threads 11 will be thrown to the left according to the Figures 1 and 2 and its teeth 16 caused to engage the teeth 18 of the slidable member 17 since the teeth 13 have released the teeth 14. By further back pedaling the nut 12 moves the slidable member 17 against the expansible sleeve 21 and the wedge 25 is forced into the notch 23 expanding the sleeve 21 so as to make contact with the interior surface of the hub 5. By the pressure from the member 17 the sleeve 21 will be pushed a little to the left (Figures 1 and 2) and thus the wedge 26 will be forced into the notch 24 and also expand the sleeve 21 in the same way as the wedge 25. The rotation moment effected upon the sleeve 21 when braking will accordingly be transmitted from the notch 29 through the bearing cone 2 upon the portion of the cyclic frame where said cone 2 is secured in any known way as well as from the notch 30 through the slidable member 17, the nut 12, the head 6 and the sprocket gear 8 finally upon the pedals.

What is claimed as new to be protected by Letters Patent is:

In a coaster brake, the combination of a non-rotatable spindle, a hub rotatably mounted thereon, an expansible sleeve within said hub provided with a longitudinal slot extending throughout the entire length thereof and having a recess in each of its ends, said slot being increased in width at its ends to provide axially extending wedge-shaped notches diverging each towards the respective end of the sleeve, an axially slidable member at one end of the expansible sleeve having a longitudinally projecting wedge and a lug, said wedge cooperating with the wedge-shaped notch in the adjacent end of the sleeve and said lug cooperating with the adjacent recess, a member stationary with relation to the non-rotatable spindle at the opposite end of the expansible sleeve and provided with an axially projecting wedge and a lug cooperating with the adjacent notch and recess, respectively, whereby upon back-pedaling motions said wedges expand the sleeve against the hub and said lugs thereby prevent rotation of the expanded sleeve with respect to the spindle.

In testimony whereof we have affixed our signatures.

EDVARD ENSTRÖM.
ERNST ALFRED HILDING.